(12) United States Patent
Lee et al.

(10) Patent No.: US 10,550,250 B2
(45) Date of Patent: Feb. 4, 2020

(54) COMPOSITIONS OF POLYPROPYLENE HAVING EXCELLENT TACTILE SENSATION AND DIMENSIONAL STABILITY

(71) Applicants: Hyundai Motor Company, Seoul (KR); Kia Motors Corporation, Seoul (KR); GS CALTEX, Seoul (KR); SEOYON E-HWA, Seoul (KR)

(72) Inventors: Han Ki Lee, Hwaseong-Si (KR); Jung Gyun Noh, Anyang-si (KR); Hak Soo Kim, Yongin-si (KR); Kyung Soon Jang, Ansan-si (KR); Yong Ho Kim, Guri-si (KR); Dong Han Kim, Hwaseong-si (KR); Woong Jae Boo, Yongin-si (KR); Byung Wook Kang, Daejeon (KR); Seung Joon Lee, Daejeon (KR); Won Gil Kim, Asan-si (KR)

(73) Assignees: Hyundai Motor Company, Seoul (KR); Kia Motors Corporation, Seoul (KR); GS CALTEX, Seoul (KR); SEOYON E-HWA, Seoul (KR)

( * ) Notice: Subject to any disclaimer, the term of this patent is extended or adjusted under 35 U.S.C. 154(b) by 313 days.

(21) Appl. No.: 15/374,252

(22) Filed: Dec. 9, 2016

(65) Prior Publication Data
US 2017/0313864 A1 Nov. 2, 2017

(30) Foreign Application Priority Data
May 2, 2016 (KR) .......................... 10-2016-0053731

(51) Int. Cl.
*C08L 23/08* (2006.01)

(52) U.S. Cl.
CPC ........... *C08L 23/08* (2013.01); *C08L 2205/02* (2013.01); *C08L 2205/035* (2013.01)

(58) Field of Classification Search
CPC ...... C08L 23/08; C08L 23/0812; C08L 23/14; C08L 23/26; C08L 23/12; C08J 5/043; C08J 5/04; C08K 3/00; C08K 7/02
See application file for complete search history.

(56) References Cited

U.S. PATENT DOCUMENTS

2015/0073076 A1 3/2015 Kim et al.

FOREIGN PATENT DOCUMENTS

| JP | 2013-112718 A | 6/2013 |
|---|---|---|
| KR | 10-0154604 B1 | 12/1998 |
| KR | 10-0544352 B1 | 1/2006 |
| KR | 10-0854322 B1 | 8/2008 |
| KR | 10-2010-0007153 A | 1/2010 |
| KR | 10-2014-0059377 A | 5/2014 |
| KR | 10-1459951 B1 | 11/2014 |

*Primary Examiner* — Peter D. Mulcahy
(74) *Attorney, Agent, or Firm* — Morgan, Lewis & Bockius LLP

(57) ABSTRACT

Compositions of high-rigid polypropylene composite resin are provided herein. Such compositions having excellent tactile sensation and dimensional stability, and more particularly, the compositions of polypropylene composite resin having excellent tactile sensation such as thermoplastic rubber, excellent impact strength and rigidity, and low shrinkage anisotropy.

The compositions of polypropylene composite resin provided herein also have excellent impact strength and rigidity as well as excellent tactile sensation such as a thermoplastic rubber and low shrinkage anisotropy. Thus, they exhibit excellent moldability and the compositions can be molded into a vehicle component. Furthermore, the compositions of polypropylene composite resin have excellent tactile sensation and can be used as a high-quality material that does not require separate painting and maintains excellent physical properties and dimensional stability as a vehicle component.

14 Claims, No Drawings

COMPOSITIONS OF POLYPROPYLENE HAVING EXCELLENT TACTILE SENSATION AND DIMENSIONAL STABILITY

CROSS-REFERENCE TO RELATED APPLICATION

This application claims under 35 U.S.C. § 119(a) the benefit of Korean Patent Application No. 10-2016-0053731, filed on May 2, 2016, the entire contents of which are incorporated herein by reference for all purposes.

BACKGROUND

Technical Field

The present disclosure relates to compositions of high-rigid polypropylene composite resin having excellent tactile sensation and dimensional stability. More particularly, it relates to compositions of polypropylene composite resin having excellent tactile sensation such as thermoplastic rubber, excellent impact strength and rigidity, and low shrinkage anisotropy.

Background Art

As environment-friendly vehicles become important issues in the industry, a need for research on vehicle components using high-functional plastic has been increased. In general, surface treating method of exterior components in the vehicle varies according to vehicle model. In the case of low-price vehicle models, unpainting or painting is common, and in the case of expensive vehicle models, an in-mold grain method and thermoplastic rubber overmolding are used. In the case of best-specification vehicles, high-quality materials such as leather covering or polyurethane spraying are frequently used.

However, in the case of a surface treating method, a separate process is added and the costs of the raw material are increased and many environmental problems are caused. Thus, there are aspects of the surface treating method that go against the worldwide eco-friendly trend in the vehicle industry.

In order to overcome this, compositions of polypropylene composite resin are proposed, in particular polypropylene composite resins which have excellent moldability, tactile sensation, and scratch resistance, as well as enhanced rigidity and impact strength when mixed with a long fiber and a thermoplastic elastomer. However, in the cooling step of the method of producing an actual product, the shrinkage anisotropy is large. Thus, the composition can negatively effect the function of the product, and the rigidity of the composition can be insufficient as compared to other composite resin compositions used in the related art.

Accordingly, research into the compositions of polypropylene composite resin which are suitable for exterior component materials in vehicles, particularly actual functional components is needed.

The above information disclosed in this Background section is only for enhancement of understanding of the background of the invention and therefore it may include information that does not form the prior art that is already known in this country to a person of ordinary skill in the art.

SUMMARY OF THE DISCLOSURE

The present invention has been made in an effort to solve the above-described problems associated with prior art.

The present invention has been made in an effort to provide compositions of polypropylene composite resin capable of providing a high-quality molded article having excellent tactile sensation, rigidity, impact strength, and dimensional stability.

In one aspect, the present invention provides compositions of high-rigid polypropylene composite resin having excellent tactile sensation and dimensional stability, the compositions including: a polypropylene resin composition A including (a-1) from about 23 to about 60 wt % of polypropylene resin which is one or more kinds selected from the group consisting of homopolypropylene and a propylene-ethylene copolymer having the ethylene content of from about 5 to about 30 wt %, (a-2) from about 1 to about 7 wt % of modified polypropylene to which about 5 to about 10 wt % of a polar group is introduced, and (a-3) from about 38 to about 70 wt % of a long-fiber reinforcing material; and a polypropylene resin composition B including (b-1) from about 16 to about 30 wt % of a propylene-ethylene copolymer having the ethylene content of from about 5 to about 30 wt %, (b-2) from about 30 to about 50 wt % of thermoplastic rubber of which the size of a crystal area is adjusted to from about 10 to about 50 nm, (b-3) from about 17 to about 28 wt % of propylene-ethylene random polypropylene, and (b-4) from about 6 to about 15 wt % of an inorganic filler.

In a preferred embodiment, a weight ratio of the polypropylene resin composition A to the polypropylene resin composition B may be about 1:3.5 to about 1:1.

In another preferred embodiment, in the modified polypropylene (a-2), one or more polar groups selected from the group consisting of unsaturated carboxylic acids, derivatives of unsaturated carboxylic acids, and organic silane compounds may be introduced to polypropylene copolymer.

In still another preferred embodiment, the long-fiber reinforcing material (a-3) may be one or more kinds selected from the group consisting of glass fibers, carbon fibers, polymer fibers, basalt fibers, natural fibers, and metal fibers.

In yet another preferred embodiment, the long-fiber reinforcing material (a-3) may have a length of about 4 to about 21 mm, e.g., about 4, 5, 6, 7, 8, 9, 10, 11, 12, 13, 14, 15, 16, 17, 18, 19, 20 or about 21 mm.

In still yet another preferred embodiment, the inorganic filler may have the number average particle size of 10 microns or less, and be one or more kinds selected from the group consisting of talc, calcium carbonate, barium sulfate, glass bubbles, and glass beads.

In another aspect, the present invention provides a molded article prepared by the compositions of polypropylene composite resin.

The compositions of polypropylene composite resin according to the present invention have excellent impact strength and rigidity as well as excellent tactile sensation such as a thermoplastic rubber and low shrinkage anisotropy. Thus, the compositions can maintain excellent moldability and can be molded into a component. Furthermore, the compositions of polypropylene composite resin have excellent tactile sensation to express a high-quality material without a separate painting process and hold excellent properties and dimensional stability as a vehicle component.

The compositions of polypropylene composite resin according to the present invention can be used to replace vehicle components made by thermoplastic elastomer overmolding or painting of interior. The compositions of polypropylene composite resin can be produced using a simple process, can reduce costs, and are environment-friendly.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. Further, in the following description, a detailed explanation of known related technologies may be omitted to avoid unnecessarily obscuring the subject matter of the present invention.

The present invention provides compositions of high-rigid polypropylene composite resin having excellent tactile sensation and dimensional stability. The compositions can include: a polypropylene resin composition A comprising (a-1) from about 23 to about 60 wt % of polypropylene resin, wherein the polypropylene resin is one or more kinds selected from the group consisting of homopolypropylene and a propylene-ethylene copolymer having an ethylene content of about 5 to about 30 wt %, (a-2) from about 1 to about 7 wt % of modified polypropylene to which from about 5 to about 10 wt % of a polar group is introduced, and (a-3) from about 38 to about 70 wt % of a long-fiber reinforcing material; and a polypropylene resin composition B comprising (b-1) from about 16 to about 30 wt % of a propylene-ethylene copolymer having an ethylene content of about 5 to about 30 wt %, (b-2) from about 30 to about 50 wt % of thermoplastic rubber having a crystal area size adjusted to about 10 to about 50 nm, (b-3) from about 17 to about 28 wt % of propylene-ethylene random polypropylene, and (b-4) from about 6 to about 15 wt % of an inorganic filler.

Hereinafter, the compositions of high-rigid polypropylene composite resin having excellent tactile sensation and dimensional stability according to exemplary embodiments of the present invention will be described in more detail.

The compositions of polypropylene composite resin according to one aspect of the present invention includes: a polypropylene resin composition A including: (a-1) from about 23 to about 60 wt % of polypropylene resin wherein the polypropylene resin is one or more kinds selected from the group consisting of homopolypropylene and a propylene-ethylene copolymer having ethylene content of about 5 to about 30 wt %, (a-2) from about 1 to about 7 wt % of modified polypropylene to which about 5 to about 10 wt % of a polar group is introduced, and (a-3) from about 38 to about 70 wt % of a long-fiber reinforcing material; and a polypropylene resin composition B including: (b-1) from about 16 to about 30 wt % of a propylene-ethylene copolymer having an ethylene content of about 5 to about 30 wt %, (b-2) from about 30 to about 50 wt % of thermoplastic rubber having a crystal area size adjusted to about 10 to about 50 nm, (b-3) from about 17 to about 28 wt % of propylene-ethylene random polypropylene, and (b-4) from about 6 to about 15 wt % of an inorganic filler.

The compositions of polypropylene composite resin described herein, have excellent tactile sensation such as a thermoplastic rubber, excellent impact strength and rigidity, and low shrinkage anisotropy and thus have excellent dimensional stability despite being molded as vehicle components. The compositions can be produced by introducing a long fiber to a polypropylene resin and combining it with a polypropylene resin mixed with a thermoplastic rubber and an inorganic filler at a predetermined ratio, The present invention relates to compositions of polypropylene composite resin that include various types of additives. The additives can be introduced by physically mixing a pellet A comprising a polypropylene resin and a long fiber and a pellet B comprising a polypropylene resin, a thermoplastic rubber, and an inorganic filler through a pultrusion impregnation process.

The pellet A may be prepared from a polypropylene resin composition A containing (a-1) from about 23 to 60 wt % of polypropylene resin comprising a mixture of homopolypropylene and a propylene-ethylene copolymer having an ethylene content of about 5 to about 30 wt %, (a-2) from about 1 to 7 wt % of modified polypropylene having about 5 to 10 wt % of a polar group, and (a-3) from about 38 to 70 wt % of a long-fiber reinforcing material.

In detail, the polypropylene resin (a-1) is used as an impregnated resin of the pellet A. The polypropylene resin (a-1) is a high-crystalline polymer constituted by homopolypropylene having only propylene as a monomer and a propylene-ethylene copolymer having propylene and ethylene as monomers. The two polymers may be used alone or in combination of the polypropylene and the propylene-ethylene copolymer.

The homopolypropylene has a melt index of about 40 g/min to about 1,300 g/min (e.g., about 40, 100, 200 300, 400, 500, 600, 700, 800, 900, 1000, 1100, 1200 or about 1300 g/ml) and particularly, about 45 g/min to about 1,100 g/min (e.g., about 45, 50, 100, 200 300, 400, 500, 600, 700, 800, 900, 1000, or about 1100 g/min).

When the melt index is less than about 40 g/min (@ 230° C., 2.16 kg), flowability, moldability and impregnation of the long fiber deteriorate and rigidity may be decreased. When the melt index is greater than 1,300 g/min (@ 230° C., 2.16 kg), surface impact strength deteriorates and a shrinkage rate is increased.

The homopolypropylene may have a poly-diversity index (PDI) of about 2 to 4 (e.g., about 2, 3, or about 4). When the PDI is less than about 2, processability deteriorates and when the PDI is equal to or greater than 4, the rigidity deteriorates and dimensional stability deteriorates, corresponding to an increase of shrinkage anisotropy.

The propylene-ethylene copolymer preferably has the ethylene content of about 5 to about 30 wt % (e.g., about 5 wt %, 10 wt %, about 15 wt %, 20 wt %, about 25 wt %, or about 30 wt %), and preferably, from about 5 to about 20 wt % (e.g., about 5 wt %, 10 wt %, about 15 wt %, or about 20 wt %). When the ethylene content is less than about 5 wt %, impact resistance which is a basic property deteriorates, and when the ethylene content is greater than about 30 wt %, the rigidity and the dimensional stability of the final product deteriorate. In exemplary embodiments, the specific gravity of the copolymer is about 0.89 to about 0.91 g/cm$^3$, and the melt index is about 25 g/min to about 105 g/min, and preferably, from about 30 g/min to about 100 g/min (e.g., about 30, 40, 50, 60, 70, 80 90 or about 100 g/min). When the melt index is less than about 25 g/min (@ 230° C., 2.16 kg), the moldability deteriorates, and when the melt index is greater than about 105 g/min (@ 230° C., 2.16 kg), izod and surface impact properties deteriorate.

A mixed ratio of the mixture of the homopolypropylene and the propylene-ethylene copolymer is preferably about 95 to 75 wt % of the propylene-ethylene copolymer to about 5 to 25 wt % of the homopolypropylene, and in some cases, about 95 to 80 wt % (e.g., about 95, 94, 93, 92, 91, 90, 89, 88, 87, 86, 85, 84, 83, 82, 81, or about 80 wt %) of the propylene-ethylene copolymer to about 5 to 20 wt % (e.g., about 5, 6, 7, 8, 9, 10, 11, 12, 13, 14, 15, 16, 17, 18, 19, or about 20 wt %) of the homopolypropylene.

The homopolypropylene is important to increase the rigidity and ensure excellent moldability and dimensional stability, and the propylene-ethylene copolymer increases the izod and surface impact properties and thus, the two components are mixed to be complementary within the desired range.

In exemplary embodiments of the present invention, the compositions include from about 23 to 60 wt % (e.g., about 23, 25, 30, 33, 35, 37, 40, 43, 45, 47, 50, 53, 55, 57, or about 60 wt %) polypropylene resin comprising a mixture of the homopolypropylene and the propylene-ethylene copolymer having an ethylene content of about 5 to 30 wt % (e.g., about 5, 10, 15, 20, 25, or about 30 wt %).

When the polypropylene resin is less than about 23 wt %, the long fiber is not efficiently impregnated in the pultrusion impregnation process, and when the polypropylene resin is greater than about 60 wt %, the shrinkage anisotropy is increased, distortion of the molded article is severe, and properties such as rigidity and impact strength deteriorate. Thus, the polypropylene resin is in the disclosed range from about 23 to 60 wt % (e.g., about 23, 25, 30, 35, 40, 45, 50, 55 or about 60 wt %).

In the modified polypropylene resin (a-2), the polar group can be introduced from about 5 to 10 wt % (e.g, about 5, 6, 7, 8, 9, or about 10 wt %), and preferably from about 5 to 8.5 wt %. (e.g., about 5, 5.5, 6, 6.5, 7, 7.5, 8, or about 8.5 wt %) When the polar group is less than about 5 wt %, compatibility of the inorganic filler, the long-fiber reinforcing material, and the polypropylene resin deteriorates, and when the polar group is greater than about 10 wt %, problems of brittleness arise and the water content is increased. Further, in the modified polypropylene, one or more kinds selected from the group consisting of unsaturated carboxylic acid and derivatives thereof, and an organic silane compound may be introduced to the polypropylene polymer.

The modified polypropylene resin can be included from about 1 to 7 wt % (e.g., about 1, 2, 3, 4, 5, 6, or about 7% wt %), and preferably from about 1 to 6.5 wt % (e.g., about 1, 1.5, 2, 2.5, 3, 3.5, 4, 4.5, 5, 5.5, 6, or about 6.5% wt %). When the content of the modified polypropylene resin is less than about 1 wt %, dispersibility of the inorganic filler and the long-fiber reinforcing material deteriorates and thus, the property of the molded article is not uniform, aggregation is locally generated, the modified polypropylene resin is seen on the surface of the molded article, and defects in the molded article are generated. When the content of the modified polypropylene resin is greater than about 7 wt %, problems of brittleness occur and the water content is increased.

The long-fiber reinforcing material (a-3) preferably has a length of about 4 to 21 mm, (e.g., about 4, 5, 6, 7, 8, 9, 10, 11, 12, 13, 14, 15, 16, 17, 18, 19, 20, or about 21 mm). When the length of the long-fiber reinforcing material is less than about 4 mm, the length of the residual fiber remaining in the product after molding is decreased and thus the long-fiber no longer functions as the reinforcing material. Thus, the rigidity and the impact strength deteriorate and the shrinkage rate is increased. When the length thereof is greater than about 21 mm, a raw material is not smoothly injected during processing and thus productivity is lowered.

The content of a focusing material in the long-fiber reinforcing material is from about 1 to 3 wt % (e.g, about 1, 2, or about 3 wt %), and preferably, from about 1 to 2.8 wt % (e.g., about 1, 1.1, 1.2, 1.3, 1.4, 1.5, 1.6, 1.7, 1.8, 1.9, 2.0, 2.1, 2.2, 2.3, 2.4, 2.5, 2.6, 2.7, or about 2.8 wt %). When the content of the focusing material is greater than about 3 wt %, properties of the molded article deteriorate and the brittleness is increased.

The long-fiber reinforcing material may use one or more kinds selected from the group consisting of glass fibers, carbon fibers, polymer fibers, basalt fibers, natural fibers, metal fibers, and mixtures thereof. In some embodiments, the glass fiber may preferably have a diameter of about 10 to 30 μm (e.g., about 10, 15, 20, 25, or about 30 μm). When the diameter of the glass fiber is less than about 10 μm, there is a problem in that a single yarn is generated when producing a product by extruding, and when the diameter thereof is greater than about 30 μm, there are problems with processability and the impregnation deteriorates. As such, the glass fiber with a diameter of about 10 to about 30 μm is preferred.

The pellet B may be prepared from a polypropylene resin composition B containing: (b-1) from about 16 to about 30 wt % of a propylene-ethylene copolymer having an ethylene content of about 5 to about 30 wt %, (b-2) from about 30 to about 50 wt % of thermoplastic rubber with a crystal area size adjusted to about 10 to about 50 nm, (b-3) from about 17 to about 28 wt % of propylene-ethylene random polypropylene, and (b-4) from about 6 to about 15 wt % of an inorganic filler.

The propylene-ethylene copolymer can have an ethylene content of about 5 to 30 wt % (e.g, about 5, 10, 15, 20, 25, or about 30 wt %), and preferably, from about 15 to 30 wt % (e.g., about 15, 16, 17, 18, 19, 20, 21, 22, 23, 24, 25, 26, 27, 28, 29 or about 30 wt %). When the ethylene content is less than about 5 wt %, impact resistance which is a basic property deteriorates, and when the ethylene content is greater than about 30 wt %, the rigidity and the dimensional stability of the final product deteriorate. A propylene-ethylene copolymer with an ethylene content of about 5 to 30 wt % is suitable. In some embodiments, the specific gravity of the copolymer is from about 0.89 to about 0.91 g/cm$^3$, and the melt index is from about 25 g/min to about 105 g/min, and preferably from about 30 g/min to 100 g/min. When the melt index is less than about 25 g/min (@ 230° C., 2.16 kg), the moldability deteriorates, and when the melt index is greater than about 105 g/min (@ 230° C., 2.16 kg), izod and surface impact properties deteriorate.

The propylene-ethylene copolymer can be included from about 16 to 30 wt % (e.g, about 16, 20, 25, or about 30 wt %), and preferably from about 16 to 24 wt % (e.g., about 16, 17, 18, 19, 20, 21, 22, 23 or about 24 wt %). When the content of the propylene-ethylene copolymer is less than about 16 wt %, the izod and surface impact properties are insufficient and when the content thereof is greater than about 30 wt %, the moldability and the dimensional stability deteriorate, and thus the function of the component can not be performed.

In the thermoplastic rubber (b-2), the size of the crystal may preferably be adjusted to from about 10 to 50 nm (e.g, about 10, 15, 20, 25, 30, 35, 40, 45 or about 50 nm). The thermoplastic rubber plays an important role in providing excellent tactile sensation in the present invention and serves to minimize the shrinkage anisotropy by providing the excellent dimensional stability. The crystal size is limited to the range of about 10 to 50 nm, and thus its melting point Tm is about 130° C. to 170° C. (e.g, about 130, 140, 150, 160 or about 170° C.) and specific gravity is 0.86 to 0.87 g/cm³. When the crystal size is less than about 10 nm, the crystallinity is excessively decreased and thus the rigidity and the dimensional stability deteriorate, and when the crystal size is greater than about 50 nm, the moldability is poor and the dimensional stability deteriorates. In some cases, when the crystal size is in the preferred range, the elasticity in a non-crystal area is most effectively increased and the impact performance is excellent. Additionally, the range of the melting point is lower than the general molding condition, and thus flowability is relatively high and the moldability may be optimized. The thermoplastic rubber can be an ethylene-α-olefin copolymer having carbon atoms (a) of 4 or more, and having a melt index from about 0.1 g/10 min to about 15 g/10 min (@ 230° C., 2.16 kg) and preferably from about 0.1 g/10 min to 13 g/10 min (@ 230° C., 2.16 kg). When the melt point is less than about 0.1 g/10 min, deterioration of the flowability and dispersibility occurs and when the melt point is greater than about 15 g/10 min, surface impact strength deteriorates.

In exemplary embodiments of the present invention the thermoplastic rubber can be included in from about 30 to 50 wt % (e.g., about 30, 35, 40, 45 or about 50 wt %), and preferably from about 37 to 48 wt % (e.g., about 37, 38, 39, 40, 41, 42, 43, 44, 45, 46, 47 or about 48 wt %). When the content thereof is less than about 30 wt %, the tactile sensation becomes hard and the impact property may deteriorate, and when the content thereof is greater than about 50 wt %, the rigidity greatly deteriorates and cooling during molding can not be properly performed, and thus the moldability may deteriorate.

The ultra-high fluidity propylene-ethylene random polypropylene (b-3) can have a melt index of about 70 g/10 min to 100 g/10 min (e.g, about 70, 80, 90 or about 100 g/10 min) (@ 230° C., 2.16 kg) and preferably of about 75 g/10 min to 95 g/10 min (@230° C., 2.16 kg) (e.g., about 75, 76, 77, 78, 79, 80, 81, 82, 83, 84, 85, 86, 87, 88, 89, 90, 91, 92, 93, 94 or about 95 g/10 min). When the melt index is less than about 70 g/10 min, the moldability and the dispersibility deteriorate, and when the melt index is greater than about 100 g/10 min, the rigidity of the molded article deteriorates.

The random polypropylene can be included in the present invention at about 17 to 28 wt % (e.g, about 17, 18, 19, 20, 21, 22, 23, 24, 25, 26, 27, or about 28 wt %). When the content thereof is less than about 17 wt %, the rigidity of the molded article deteriorates and the moldability is poor due to the deterioration of the flowability, and when the content thereof is greater than about 28 wt %, the izod and surface impact property of the product may deteriorate.

The inorganic filler (b-4) uses one or more kinds selected from the group consisting of talc, calcium carbonate, barium sulfate, glass bubbles, glass beads, and mixtures thereof. The average particle size of the inorganic filler is about 10 microns or less (e.g., about 10, 9, 8, 7, 6, 5, 4, 3, 2, about 1 micron or less). When the average particle size is greater than about 10 microns, the dispersibility deteriorates and thus property differences in a part of the molded article may occur. Additionally, the inorganic filler can be exposed on the surface and thus surface defects may be generated.

The inorganic filler which provides excellent dimensional stability and a high-rigid function to the product by reducing the shrinkage anisotropy can be included in the present invention in a range from about 6 to 15 wt % (e.g., about 6, 7, 8, 9, 10, 11, 12, 13, 14 or about 15 wt %). When the content thereof is less than about 6 wt %, the shrinkage anisotropy is increased and thus, the dimensional stability deteriorates and the rigidity deteriorates, and when the content thereof is greater than about 15 wt %, the dispersibility of the inorganic filler deteriorates and the productivity is decreased, and thus industrial efficiency is lowered.

The pellet A and the pellet B according to the present invention can be physically mixed and used. A preferable weight ratio of the pellet A to the pellet B is about 1:3.5 to about 1:1. When a weight ratio of the pellet A to the pellet B is less than about 1:3.5, the ratio of the thermoplastic rubber is relatively too high and the cooling process can not properly performed. Also, the productivity is declined, the rigidity deteriorates, and various additives are not dispersed. When the weight ratio of the pellet A to the pellet B is greater than about 1:1, the ratio of the long-fiber reinforcing material is excessively high and the flowability is insufficient during molding and the long-fiber reinforcing material is exposed on the surface, causing the surface defect.

The resin composition of the present invention may add one or more additives including, but not limited to, antioxidants, neutralizing agents, antistatic agents, UV stabilizers, slip agents, and the like in order to improve the performance and processing characteristics of the molded article in addition to the main components. The additives may be adjusted and used in an appropriate range to maintain surface quality, brittleness, and basic physical properties.

When prepared according to the method described above, the compositions of polypropylene composite resin have a high-rigid property including excellent tactile sensation and dimensional stability and properties suitable for use as a vehicle material may be prepared. The compositions of polypropylene composite resin have excellent tactile sensation and thus, are industrially useful and do not require additional processes such as a painting process on the surface, an in-mold grain process, a thermoplastic rubber overmolding, and leather covering or polyurethane spraying. The compositions have excellent dimensional stability which is necessary for high productivity and efficiency in the industry.

Hereinafter, exemplary embodiments of the present invention will be described in detail. However, the present invention will be described in more detail based on the following Examples, and the present invention is not limited to the following Examples.

EXAMPLES

The following examples illustrate the invention and are not intended to limit the same.

Example 1

After 9 wt % of homopolypropylene in which the PDI is adjusted to 2, 28 wt % of propylene-ethylene copolymer having an ethylene content of 18 wt %, 3 wt % of modified polypropylene introduced with 5 wt % of maleate, 60 wt % of long glass fiber, and 1 part per hundred resin (PHR) of additives (an antioxidants and a stabilizer) were physically mixed, and a pellet A was prepared by processing composition A into a pellet form by a biaxial extruder. After 24 wt % of propylene-ethylene copolymer having the ethylene content of 18 wt %, 43 wt % of thermoplastic rubber which is an ethylene-α-olefin copolymer having carbon atoms (a) of 4 of which the crystal size is adjusted to 10 to 50 nm, 24 wt % of ultra-high fluidity propylene-ethylene random polypropylene, 9 wt % of talc, and 1 part per hundred resin (PHR) of additives (an antioxidants and a stabilizer) were physically mixed, and a pellet B was prepared by processing composition B into a pellet form by a biaxial extruder. The pellet A and the pellet B were physically mixed at a weight ratio of 3:7 and then injected under an injection condition of 220±30° C. to prepare a specimen for evaluating thermal/mechanical properties.

Example 2

By preparing the pellet A and the pellet B having the same compositions of polypropylene composite resin as the compositions used in Example 1, the pellet A and the pellet B are physically mixed at a weight ratio of 4:6 and then injected under an injection condition of 220±30° C. to prepare a specimen for evaluating thermal/mechanical properties.

Comparative Example 1

By preparing the pellet A and the pellet B having the same compositions of polypropylene composite resin as the compositions used in Example 1, the pellet A and the pellet B are physically mixed at a weight ratio of 1:9 and then injected under an injection condition of 220±30° C. to prepare a specimen for evaluating thermal/mechanical properties.

Comparative Example 2

By preparing the pellet A and the pellet B having the same compositions of polypropylene composite resin as the compositions used in Example 1, the pellet A and the pellet B are physically mixed at a weight ratio of 6:4 and then injected under an injection condition of 220±30° C. to prepare a specimen for evaluating thermal/mechanical properties.

Comparative Examples 3 to 7

Comparative Examples 3 to 7 used the same pellet A used in Example 1 and the compositions having the same components used in the pellet B of Example 1 were used and physically mixed according to a composition ratio of the following Table 1 to prepare a pellet B through a biaxial extruder. Thereafter, the pellet A and the pellet B are physically mixed at a weight ratio of 3:7 and then injected under an injection condition of 220±30° C. to prepare a specimen for evaluating thermal/mechanical properties.

TABLE 1

| | Composition (wt %) of pellet (B) | | | | | |
|---|---|---|---|---|---|---|
| | Propylene-Ethylene Copolymer\ | Thermoplastic rubber (Ethylene-Buthylene Copolymer) | Random Polypropylene (Propylene-Ethylene Random Polypropylene) | Talc | Additives | total |
| Comparative Example 3 | 35 | 25 | 31 | 9 | 1PHR | 100 |
| Comparative Example 4 | 15 | 60 | 16 | 9 | 1PHR | 100 |
| Comparative Example 5 | 27 | 45 | 26 | 2 | 1PHR | 100 |
| Comparative Example 6 | 20 | 43 | 19 | 18 | 1PHR | 100 |
| Comparative Example 7 | 24 | 48 | 28 | — | 1PHR | 100 |

Test Examples

Measurement of Properties of Specimen

Results listed in the following Tables 2 and 3 represent average values except for an upper limit and a lower limit by measuring 10 specimens and test methods therefor are as follows.

Measurement of Melt Index: The melt index was measured at 230° C., 2.16 kg load according to an ASTM D1238 method.

Measurement of Tensile strength and Elongation: The tensile strength was measured according to an ASTM D638 method and measured at a load application speed of 50 mm/min. The elongation was measured based on a fracture point.

Measurement of Flexural Modulus and Flexural Strength: The flexural modulus and flexural strength were measured according to an ASTM D790 method and measured at a load application speed of 10 mm/min.

Measurement of Izod impact strength: The Izod impact strength was measured by a Notched specimen at room temperature (23) and −30° C. according to an ASTM D256 method.

Measurement of Shore Hardness: The shore hardness was measured according to D-Scale based on the ASTM D2240.

Measurement of Heat Distortion Temperature: The heat distortion temperature was measured at a load of 1.82 MPa according to an ASTM D648 method.

Measurement of shrinkage anisotropy through measuring of mold shrinkage: The shrinkage anisotropy was measured by dividing a mechanical direction (MD) and a transverse direction (TD) with a specimen having a size of 128×128×3.2 mm according to the ASTM D955 method. In order to calculate the shrinkage anisotropy in the MD and TD directions of the corresponding result value, the shrinkage anisotropy was calculated by (TD mold shrinkage having a size of 128/TD mold shrinkage×100.

TABLE 2

| Measurement items | Unit | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| | | | | | Measured Result | | | | | |
| Specific gravity | g/cm³ | 1.05 | 1.10 | 0.98 | 1.00 | 1.05 | 1.05 | 1.03 | 1.11 | 1.02 |
| Tensile strength | MPa | 37 | 58 | 18 | 40 | 39 | 34 | 38 | 60 | 37 |
| Elongation | % | 2.8 | 2.5 | 9.0 | 2.1 | 3.1 | 2.9 | 7.4 | 3.4 | 8.8 |
| Flexural strength | MPa | 32 | 45 | 24 | 47 | 34 | 29 | 28 | 47 | 28 |
| Flexural modulus | MPa | 2,900 | 3,230 | 1,231 | 3,700 | 2,990 | 2,600 | 2,450 | 3,100 | 2,400 |
| Izod impact strength (room temperature) | J/m | 240 | 420 | NB (50↑) | 180 | 160 | 300 | 280 | 260 | 380 |
| Izod impact strength (−30° C.) | J/m | 150 | 192 | 220 | 85 | 80 | 165 | 140 | 120 | 180 |
| Shore hardness (15 sec) | D. | 43 | 49 | 28 | 59 | 54 | 42 | 42 | 56 | 41.5 |
| Heat distortion temperature (0.46 MPa) | ° C. | 131 | 141 | 117 | 138 | 133 | 128 | 128 | 135 | 126 |
| Shrinkage anisotropy | % | 14 | 17 | 8 | 12 | 15 | 15 | 40 | 9 | 43 |
| Appearance | — | Good | Good | Good | Good | Good | Insufficient | Good | Good | Good |

As listed in Table 2, it can be seen that the resin compositions of Examples 1 and 2 according to the present invention maintains the shrinkage anisotropy of 14 to 17% to have high rigidity while having the dimensional stability of the molded article. These resin compositions also have excellent izod impact strength and appearance. Furthermore, the shore hardness is 43 to 49 and thus, the embossing may be applied to various textures and the tactile sensation may be soft.

Meanwhile, only within the range of a mixed ratio between the pellets of Examples 1 and 2, the resin compositions may have excellent rigidity, impact strength, tactile sensation, appearance, and a balance of the shrinkage anisotropy, and in the pellet compositions, the features may be implemented only within the range according to the present invention.

In Comparative Examples 1 and 2, the mixed ratio between the pellets deviates from the range of the present invention. It can be seen that in Comparative Example 1, the rigidity is insufficient, and in Comparative Example 2, the shore hardness is high and the excellent tactile sensation is not implemented, and thus high rigidity and excellent tactile sensation are ensured only in the range of the present invention.

In Comparative Examples 3 and 4, the content of the thermoplastic rubber in the compositions of the pellet B deviates from the range of the present invention. In Comparative Example 3, the shore hardness is 54 and thus the excellent tactile sensation is not implemented, and in Comparative Example 4, gas stains and flow stains are severe on the appearance of the molded article and the appearance cannot be an appearance of a normal article.

In Comparative Examples 5, 6, and 7, the content of talc of the compositions of the pellet B deviates from the range of the present invention. It was confirmed that in Comparative Example 5, the shrinkage anisotropy was 40% and thus the dimensional stability of the molded article deteriorated. In Comparative Example 6, the shore hardness was 56 and thus the excellent tactile sensation was not implemented. In Comparative Example 7, the shrinkage anisotropy was 43% and thus the dimensional stability of the molded article was insufficient like Comparative Example 5 and the dimensional stability which was one of the important features of the present invention was not exhibited.

As listed in Table 2, it can be seen that the compositions of polypropylene composite resin of Examples 1 and 2 according to the present invention may possess excellent rigidity, impact strength, tactile sensation, appearance, and shrinkage anisotropy by appropriately using respective components thereof as compared with Comparative Examples 1 to 7 which deviate from the range of the present invention.

The present invention can directly replace components to which thermoplastic elastomer overmolding or painting is applied and ensure the productivity and the quality in the industry to become a realistic alternative, and thus the present invention can be widely applied to other plastic components or materials in addition to vehicle interior materials such as a crash pad, a door trim, a pillar trim, and a sun visor of the vehicle.

The invention has been described in detail with reference to preferred embodiments thereof. However, it will be appreciated by those skilled in the art that changes may be made in these embodiments without departing from the principles and spirit of the invention. Therefore, the scope of which is defined in the appended claims and their equivalents.

What is claimed is:

1. A composition of rigid polypropylene composite resin having tactile sensation and dimensional stability, the composition comprising:
   a polypropylene resin composition A comprising
   (a-1) from 23 wt % to 60 wt % of polypropylene resin, wherein the polypropylene resin is one or more selected from the group consisting of homopolypropylene and a propylene-ethylene copolymer having an ethylene content of from 5 wt % to 30 wt %,
   (a-2) from 1 wt % to 7 wt % of modified polypropylene to which 5 wt % to 10 wt % of a polar group is introduced, and
   (a-3) from 38 wt % to 70 wt % of a long-fiber reinforcing material; and
   a polypropylene resin composition B comprising
   (b-1) from 16 wt % to 30 wt % of a propylene-ethylene copolymer having an ethylene content of 5 to 30 wt %,
   (b-2) from 30 wt % to 50 wt % of thermoplastic rubber having a crystal area size of 10 to 50 nm,
   (b-3) from 17 wt % to 28 wt % of propylene-ethylene random polypropylene, and (b-4) from 6 wt % to 15 wt % of an inorganic filler, wherein a weight ratio of the polypropylene resin composition A to the polypropylene resin composition B is 1:3.5 to 1:1, and wherein the one or more polar groups of the modified polypropylene (a-2) is selected from the group consisting of unsaturated carboxylic acids, derivatives of unsaturated carboxylic acids, and organic silane compounds.

2. The composition of claim 1, wherein the homopolypropylene has a melt index of 40 g/10 min to 1,300 g/10 min (@2 30° C., 2.16 kg) and a poly-diversity index (PDI) of 2 to 4.

3. The composition of claim 1, wherein the propylene-ethylene copolymer of (a-1) and the propylene-ethylene copolymer (b-1) have a specific gravity of 0.89 to 0.91 g/cm$^3$ and a melt index of 25 g/10 min to 130 g/10 min (@230° C., 2.16 kg).

4. The composition of claim 1, wherein the propylene-ethylene copolymer of (a-1) has the ethylene content of 5 wt % to 20 wt % and the propylene-ethylene copolymer of (b-1) has the ethylene content of 15 wt % to 30 wt %.

5. The composition of claim 1, wherein the polar group in the modified polypropylene is from 5 wt % to 8.5 wt % and the modified polypropylene is from 1 wt % to 6.5 wt %.

6. The composition of claim 1, wherein the long-fiber reinforcing material of (a-3) is one or more selected from the group consisting of glass fibers, carbon fibers, polymer fibers, basalt fibers, natural fibers, and metal fibers.

7. The composition of claim 1, wherein the long-fiber reinforcing material of (a-3) has a length of 4 to 21 mm.

8. The composition of claim 1, wherein the thermoplastic rubber of (b-2) is an ethylene-α-olefin copolymer having carbon atoms (α) of 4 or more, and a melt index of 0.1 g/10 min to 15 g/10 min (@230° C., 2.16 kg), a melting point (Tm) of 130° C. to 170° C., and a specific gravity of 0.86 to 0.87 g/cm$^3$.

9. The composition of claim 1, wherein the thermoplastic rubber of (b-2) is from 37 wt % to 48 wt %.

10. The composition of claim 1, wherein the random polypropylene of (b-3) has a melt index of from 70 g/10 min to 100 g/10 min (@ 230° C., 2.16 kg).

11. The composition of claim 1, wherein the inorganic filler has an average particle size of 10 microns or less, and is one or more selected from the group consisting of talc, calcium carbonate, barium sulfate, glass bubbles, and glass beads.

12. A molded article prepared from the composition of polypropylene composite resin of claim 1.

13. The molded article of claim 12, wherein the molded article is a vehicle interior material or an exterior material.

14. A method for preparing a molded article from the composition of polypropylene composite resin of claim 1 comprising:

mixing and injecting a pellet prepared from the polypropylene resin composition A of claim 1 and a pellet prepared from the polypropylene resin composition B of claim 1.

* * * * *